US006183543B1

(12) United States Patent
Buxbuam (10) Patent No.: US 6,183,543 B1
(45) Date of Patent: *Feb. 6, 2001

(54) APPARATUS AND METHODS FOR GAS EXTRACTION

(76) Inventor: Robert E. Buxbuam, 25451 Gardner Pl., Oak Park, MI (US) 48237

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/359,462

(22) Filed: Jul. 22, 1999

Related U.S. Application Data (63) Continuation-in-part of application No. 08/875,046, filed as application No. PCT/US96/18131 on Nov. 6, 1996, now Pat. No. 5,931,987.
(60) Provisional application No. 60/016,597, filed on May 8, 1996, provisional application No. 60/007,298, filed on Nov. 6, 1995, and provisional application No. 60/007,297, filed on Nov. 6, 1995.

(51) Int. Cl.⁷ ............................ B01D 53/22; B01D 71/02
(52) U.S. Cl. .................................. 96/11; 96/10; 55/524; 55/DIG. 5
(58) Field of Search ................................. 95/45, 53, 55, 95/56; 96/4, 7, 8, 10–12; 55/524, DIG. 5

(56) References Cited

U.S. PATENT DOCUMENTS

| | | | |
|---|---|---|---|
| 2,824,620 | * | 2/1958 | de Rosset ............................ 96/11 X |
| 2,958,391 | * | 11/1960 | de Rosset ............................ 96/11 X |
| 3,019,853 | * | 2/1962 | Kohman et al. ...................... 96/8 X |
| 3,135,591 | * | 6/1964 | Jones .................................. 96/11 X |
| 3,238,704 | * | 3/1966 | Straschil et al. ...................... 96/11 |
| 3,241,293 | * | 3/1966 | Pfefferle ............................. 95/56 |
| 3,241,298 | | 3/1966 | Pierce ................................. 96/11 X |
| 3,245,206 | * | 4/1966 | Bonnet ............................... 96/10 |
| 3,247,648 | * | 4/1966 | McKinley ............................ 95/56 |

(List continued on next page.)

OTHER PUBLICATIONS

Booth, J.C.S., Doyle, M.L., Gee, S.M., Miller, J., Scholtz, L-A., and Walker, P.A., "Advanced Hydrogen Separation Via Thin Supported Pd Membranes," Hydrogen Energy Progress XI, vol. 1, pp. 867–878 (no date).

Primary Examiner—Robert H. Spitzer
(74) Attorney, Agent, or Firm—Gifford, Krass, Groh, Sprinkle, Anderson & Citkowski, P.C.

(57) ABSTRACT

An apparatus for extracting a gas, in particular hydrogen, from a fluid stream utilizing a plate membrane flattened with a wave spring on the low pressure side of the membrane and a turbulence generator on the high pressure side. Alternately, the membrane is folded and wrapped against a central conduit within the membrane fold. Extraction membranes have a substrate layer of Ta—W, V—Co, V—Pd, V—Au, V—Cu, V—Al, Nb—Ag, Nb—Au, Nb—Pt, Nb—Pd, V—Ni—Co, V—Ni—Pd, V—Nb—Pt or V—Pd—Au alloy or combination thereof and a first layer affixed to the outer surface of the substrate towards a mixed gas flow which is composed of palladium, platinum, rhodium, and palladium alloys.

16 Claims, 7 Drawing Sheets

U.S. PATENT DOCUMENTS

| | | | |
|---|---|---|---|
| 3,312,043 | * 4/1967 | Sexton | 96/10 |
| 3,336,730 | * 8/1967 | McBride et al. | 95/56 |
| 3,344,582 | 10/1967 | Merrill et al. | 95/56 |
| 3,350,846 | * 11/1967 | Makrides et al. | 96/11 X |
| 3,368,329 | * 2/1968 | Eguchi et al. | 96/8 |
| 3,392,510 | * 7/1968 | Koch, Jr. | 96/8 |
| 3,410,058 | 11/1968 | Oswin | 96/7 |
| 3,447,288 | * 6/1969 | Juda et al. | 96/11 |
| 3,469,372 | * 9/1969 | Yamauchi et al. | 96/11 |
| 3,782,077 | * 1/1974 | Hollister et al. | 96/11 |
| 3,981,696 | * 9/1976 | Lalis et al. | 96/8 |
| 4,313,013 | * 1/1982 | Harris | 95/56 X |
| 4,427,424 | * 1/1984 | Charpin et al. | 96/8 |
| 4,468,235 | * 8/1984 | Hill | 95/56 X |
| 4,496,373 | * 1/1985 | Behr et al. | 96/11 X |
| 4,536,196 | * 8/1985 | Harris | 95/56 X |
| 4,810,485 | * 3/1989 | Marianowski et al. | 95/56 X |
| 4,986,837 | * 1/1991 | Shibata | 96/8 X |
| 5,139,541 | * 8/1992 | Edlund | 96/11 X |
| 5,149,340 | * 9/1992 | Waycuilis | 96/11 X |
| 5,181,941 | 1/1993 | Najjar et al. | 95/56 X |
| 5,205,841 | * 4/1993 | Vaiman | 96/11 X |
| 5,215,729 | * 6/1993 | Buxbaum | 96/8 X |
| 5,259,870 | * 11/1993 | Edlund | 96/11 X |
| 5,358,553 | * 10/1994 | Najjar et al. | 96/11 |
| 5,498,278 | * 3/1996 | Edlund | 96/11 |
| 5,518,530 | * 5/1996 | Sakai et al. | 96/11 |
| 5,888,273 | * 3/1999 | Buxbaum | 96/11 X |
| 5,931,987 | * 8/1999 | Buxbaum | 96/11 X |

* cited by examiner

continuation …

APPARATUS AND METHODS FOR GAS EXTRACTION

RELATED APPLICATIONS

This application is a continuation-in-part of U.S. patent application Ser. No. 08/875,046 filed Sep. 11, 1997, now U.S. Pat. No. 5,931,987, which is the U.S. National Phase of PCT/US96/18131 filed Nov. 6, 1996, designating the U.S. and claiming benefit of U.S. provisional applications Ser. Nos. 60/016,597 filed May 8, 1996, 60/007,298 and 60/007,297 both filed Nov. 6, 1995, all of which are incorporated herein by reference.

TECHNICAL FIELD

The present invention relates to separation and purification of a gas from a fluid mixture. More particularly, the present invention relates to a membrane gas extraction module for removing preferably hydrogen from a fluid mixture.

BACKGROUND OF THE INVENTION

A common technology for extracting pure hydrogen from industrial streams, such as for hydrogenation for changing the balance of hydrogen in those streams or to increase reaction selectivity, is to use membranes of palladium or palladium alloys alone or supported structurally by a matrix. Membranes which contain thick enough palladium layers to be made without holes and not break during service tend to be expensive and have relatively high resistance to hydrogen permeation.

Several membrane variations and module designs have been proposed to minimize this effect. Membranes can include porous ceramics either by themselves or coated with palladium alloys or with silica and palladium coated refractory metals and alloys, especially those based on Nb, V, Ta, Ti, Zr. These have greater strength than palladium and palladium-based alloys, are cheaper per unit volume, and most have greater intrinsic permeabilities to hydrogen. Although the alternatives are less expensive than Pd, they are not less expensive compared to polymers. Thus, with all of these membranes more attention must be directed to module designs that make efficient use of the membrane surface and provide a high recovery percentage without undue gas-phase mass transfer resistance. To date, no commercial module has been described that is particularly efficient for large scale hydrogen extraction using any of these membranes.

An example of an apparatus for hydrogen separation is disclosed in U.S. Pat. No. 4,468,235 to Hill (Hill '235). The Hill '235 patent discloses an apparatus for separating hydrogen from fluids and includes, mounted axially in a cylindrical pressure vessel, a plurality of membranes in the form of tubes coated on either the inside or the outside or both sides with coatings having a high permeability to hydrogen. There is also a fluid flow inlet and a raffinate flow outlet and a header to collect hydrogen. No sizes or criticalities are disclosed for the extraction membrane. Additionally, since this design provides no mechanism for flow distribution or turbulence generation, the separation efficiency of this apparatus is not maximized.

Another example of a similar apparatus for hydrogen extraction is disclosed in U.S. Pat. No. 5,205,841 to Vaiman (Vaiman '841) issued Apr. 27, 1993. The Vaiman '841 patent discloses an apparatus for separating hydrogen from gas and gas liquid mixtures at low temperature. The Vaiman '841 apparatus includes a plurality of axially mounted tubes coated on both their inside and outside surfaces with palladium/platinum black. There is also a fluid flow inlet and a raffinate flow outlet and a header to collect hydrogen. Vaiman '841 does not teach any sizes or criticalities for the extraction membrane or its arrangement within the structure. Additionally, as similarly stated above regarding the Hill patent, the Vaiman '841 design provides no mechanism for flow distribution or turbulence generation. Separation efficiency of this apparatus is not maximized.

Another typical design for large hydrogen extractors uses tubular membranes of palladium-silver alloy in spiral form. This tubing generally has an outer diameter of 0.0625 to 0.125 inches and wall thickness of approximately 0.003 inches. For the smaller diameter tubes, the source hydrogen flows over the outside of several wound helixes made from 10 to 15 feet of tubing. These hydrogen extractors typically require complex expensive construction that limits heat and mass transport. Also, since pressure drops become excessive when the tube length exceeds about 25 feet, large modules end up with 40 or more nested and stacked helixes that must be hand assembled in a large tubular bundle without damaging any single one of the delicate tubes. This is a delicate construction process by any standard.

Large diameter tubes avoid maldistribution and assembly problems by driving all of the flow through a single tube. The practical limit is reached at about 100 feet. Longer lengths lead to destructive harmonic vibrations, especially during start-up and shut-down. Also, since module size increases with the square of the tube diameter, such units have had to be too big to site comfortably. Further, temperature uniformity is even harder to maintain than with $\frac{1}{16}$ inch units.

The spiral type designs are particularly difficult to form when dealing with coated refractory metals or with ceramics, as these materials are more brittle than palladium and coated membranes require more gentle handling than homogenous palladium alloys. The spiral type designs inherently have problems with scraping of the membrane surfaces and with kinking of the tubing material during manufacture thereby leading to inherent weaknesses in the tubes which are utilized under pressure. For large scale applications, these spiral-type hydrogen extractors tend to be larger in overall size than the module of the present invention thereby adding to the cost of the structure, sitting, shipping, maintenance, manufacture, and making them unpleasant to the eye.

To date, modules based on tubular ceramics or ceramic-based membranes known are based on a single pair of concentric tubes. The diameter of the ceramic membranes is approximately 0.375 inches. Such designs cannot be readily scaled up for commercial applications.

The present invention provides a hydrogen extraction module which eliminates the spiral-type extraction membranes and is much more simple to construct, more compact, and can be more easily constructed from difficult materials, such as ceramics, and from high diameter to wall ratio metal tubes.

The present invention also provides improved hydrogen recovery from relatively impure mixtures through the use of critically sized extraction membranes and turbulence generating bumps or packing.

Another approach to the problems of palladium based membranes recognizes that the specific alloys are chosen by a trade-off between cycling stability, ease of drawing, high permeance, lower volumetric cost, and relatively good surface properties. Currently, the single material that most closely meets all of these criteria is made from palladium-silver alloys containing 23 to 25% silver. These tubes typically trade off exposure for moderate cycling stability. They typically do not break for about two years in operation and have moderate drawability against their relatively high expense and high resistance to hydrogen permeation, especially at temperatures below 300° C. and for gas streams containing sulfur, carbon monoxide, and olefins.

Several options to palladium-silver membranes have been suggested, but are not in common use. For example, the British Patent No. 1,292,025 to Darling discloses a membrane requiring porous or discontinuous palladium coat over a base of refractory metal Nb, V, or Ta. The U.S. Pat. No. 4,496,373 to Bohr et al. discloses alloying the palladium layer with silver, calcium or yttrium. The patent also requires an intermediate melt layer. The U.S. Pat. No. 4,536,196 to Harris discloses essentially a palladium membrane which is coated with various metals as poisons to prevent the fouling of the palladium surface. Under some circumstances, this poisoning can be advantageous to the surface properties of the membrane, but the high cost and low reliability of palladium remains. The U.S. Pat. No. 4,313,013 to Harris shows similar palladium membranes that have been in use.

The U.S. Pat. No. 3,350,846 to Makrides et al. discloses a process of purification of hydrogen by diffusion through a very thin membrane of palladium coated Group V-B metal.

The U.S. Pat. No. 5,215,729 ('729) issued Jun. 1, 1993 to the inventor of the present application and incorporated herein by reference teaches membranes which combine the strength and high permeation of refractory metals with a coating of palladium or palladium alloys to improve the surface properties of the membranes. As with single-layer palladium alloys, selectivity is essentially 100% for hydrogen extracted. Applicant has observed that some of the best refractory metals can be difficult to fabricate into tubes or modules. Applicant has further observed that the surface properties of some of these membranes were often far better than those of single layer palladium-silver, especially at low temperatures and in the presence of carbon monoxide, hydrogen sulfide, and olefins.

In view of the above, a further object of the present invention is to improve on the properties of palladium-silver and similar alloys by adding a coating of palladium or similar materials to improve the surface properties. The resulting membranes have good strength, ease of fabrication, good durability, relatively low resistance to hydrogen even at low temperatures, improved resistance to carbon monoxide, $H_2S$ and olefins, fair resistance to embrittlement, and a hydrogen selectivity that can exceed that for palladium-silver because the operating temperature can be lower.

SUMMARY OF THE INVENTION AND ADVANTAGES

In accordance with the present invention, there is provided an apparatus for extracting hydrogen from fluid streams containing hydrogen. The apparatus includes a housing and at least one extraction membrane in the form of a sheet-type membrane disposed in the housing for extracting hydrogen from the fluid flowing therethrough. The extraction membranes have a length to width ratio of about 10:1 with a wave spring on the low pressure (pure gas) side and a turbulence-generating means on the high pressure (impure gas) side.

There is further provided a membrane composition for extracting hydrogen from fluid streams containing hydrogen. The composition capable of being formed as a tube or plate membrane. The membrane includes a substrate layer of Ta—W, V—Co, V—Pd, V—Au, V—Cu, V—Al, Nb—Ag, Nb—Au, Nb—Pt, Nb—Pd, V—Ni—Co, V—Ni—Pd, V—Nb—Pt or V—Pd—Au alloy or combination thereof and a first layer affixed to the outer surface of the substrate towards a mixed gas flow which is composed of palladium, platinum, rhodium, and palladium alloys.

A gas purification membrane of the present invention includes at least one selectively gas permeable layer having an inner and outer surface thereby defining a wall thickness. The layer is elongated along two orthogonal axis relative to a third orthogonal axis so as to define a membrane outer length and membrane outer width wherein the ratio of outer length to outer width is from 40:1 to 2:1 and the ratio of wall thickness to outer width is from 0.001:1.

The present invention further details an improved method for the manufacture of a gas purification apparatus having at least two membrane tubes wherein the improvement lies in sealing a leaking tube against entrance of an inlet gas stream in order to prevent mixed gas flow from contaminating purified gas. Membranes are further disclosed which are textured to promote turbulent gas mixture flow thereover. Additionally, internal spiral support coils are inserted into cylindrical gas purification membrane tubes to support the tubes against a pressure differential across the wall thickness of such a tube. The addition of a spiral support coil promotes the reliable performance of a thin tubular membrane, as compared to existing membranes.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figures 1A, 1B:
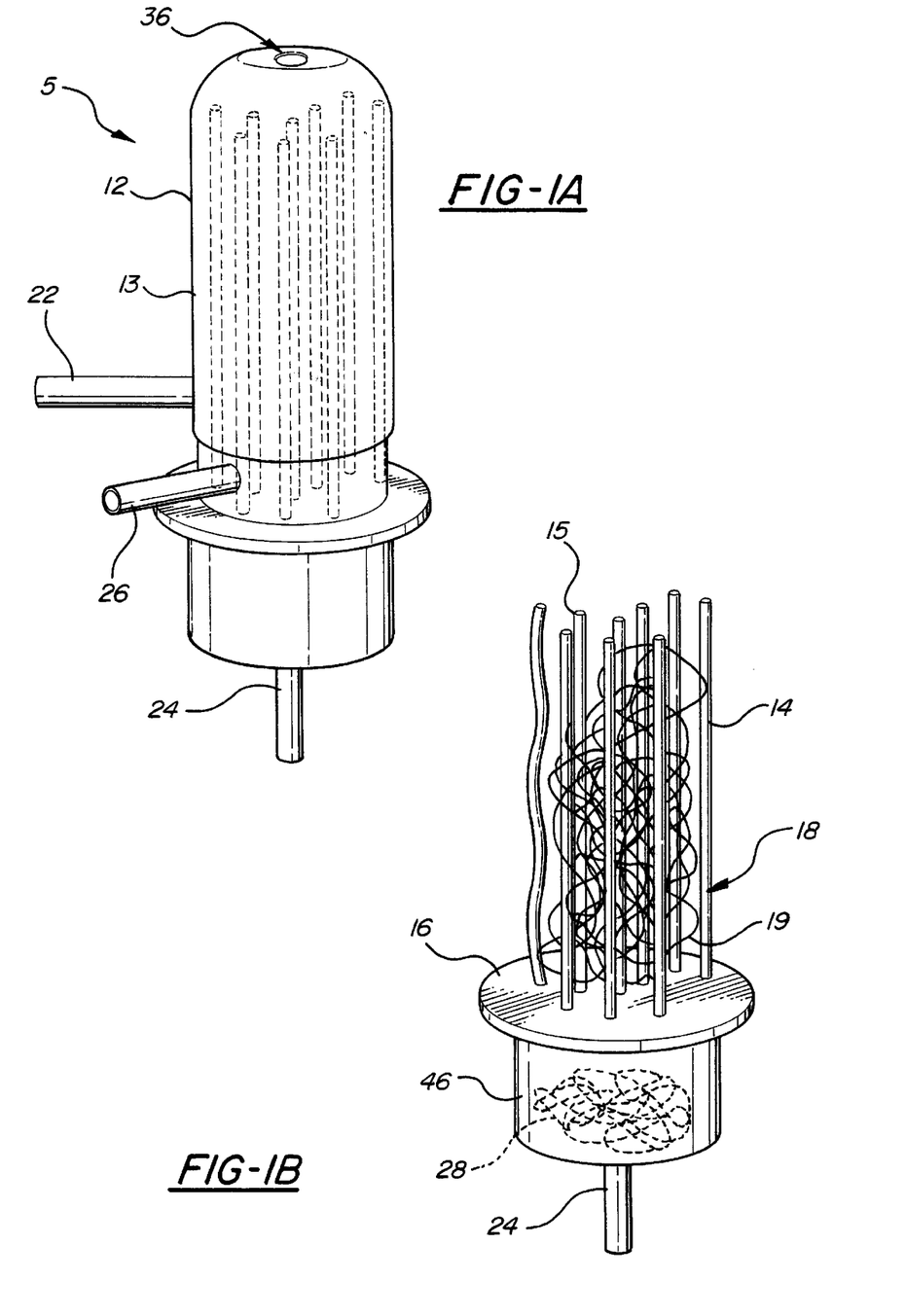
FIGS. 1A and 1B are exploded perspective views of a "pressure-outside" embodiment of the present invention.
Figure 2A:
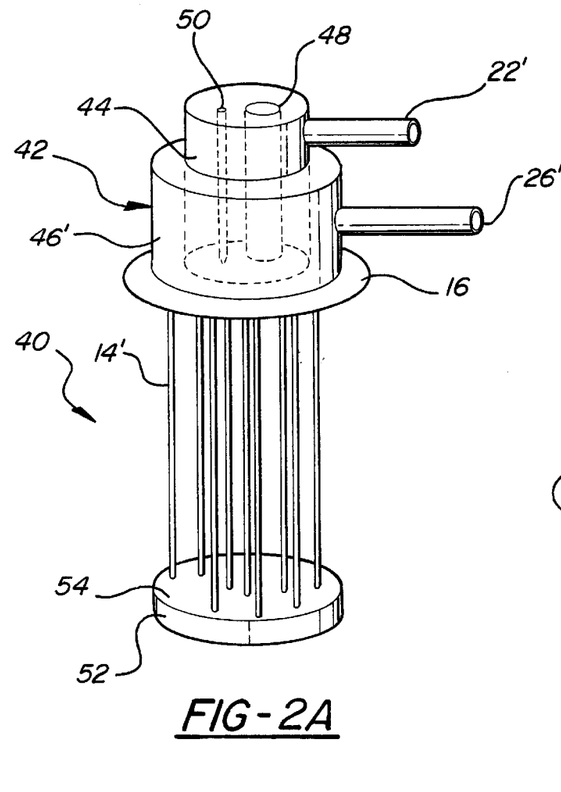
FIGS. 2A, 2B and 2C are exploded perspective views of two "pressure-inside" embodiments of the present invention.

An apparatus for extracting hydrogen from fluid streams containing hydrogen is generally shown at 5 in FIG. 1A. The Figure schematically shows a membrane system for removing hydrogen from a fluid. Mounted in a pressure vessel 12 is a plurality of membranes in the form of tubes 14. The tubes 14 are operatively connected at one end to a header 16 and the other end of the tubes 14 are either capped or can be operatively attached to a floating head 52 as shown in FIG. 2A and discussed in greater detail below. Attachment of the tubes 14 to the header 16 and the header 16 to the pressure vessel 12 can be accomplished by welding, soldering, brazing, by using a high temperature inorganic glue or by methods well known by those skilled in the art.

FIGS. 1A and 1B illustrate an embodiment of the present invention referred to as a "pressure-outside" design. In this embodiment, the inlet flow of fluid containing a mixed gas includes hydrogen flowing outside of and over the outer surface of the tubes 14. A tube cap is indicated at 15. The pressure vessel 12 includes an inlet 22 which defines a passageway for the introduction of the fluid stream containing hydrogen into the vessel 12. The pressure vessel 12 further includes a passageway disposed in fluid communication with an outlet 26. An additional outlet 24 is disposed in fluid communication with the header 16 to allow for the exit of pure extracted hydrogen from the apparatus 5. The outlet 26, disposed in fluid communication with the pressure vessel 12, is provided to allow the exit of raffinate or to allow the fluid having had some of the hydrogen removed to exit the pressure vessel 12.

The fluid enters the inlet 22 under a positive pressure. The pressure head can range from about 0 to 600 psi. The pressure head is preferably between 80 and 250 psi. Such a pressure head would normally tend to induce collapses of the planar membranes unless certain structural conditions are met as discussed below. It should be noted that these ranges are not meant to be limiting as the pressure head is dependent upon the membrane of choice.

The tubes 14 which comprise the hydrogen extraction membrane can include at least one straight or substantially straight axially aligned tube having an outer diameter ranging, for a metal substrate membrane, from approximately 0.007 inches to 0.100 inches and having a permeation barrier thickness ranging from approximately 0.0002 inches to approximately 0.01 inches. A ceramic or polymeric substrate membrane can include tubes having an outer diameter ranging from approximately 0.010 inches to 0.300 inches and having a permeation barrier thickness ranging from approximately 0.000002 inches to 0.001 inches. These ranges of outer diameters and permeation barrier thicknesses provide an optimal balance of strength, flux, and low cost of construction.

Most preferably, for metal membranes, the ratio of the wall thickness to tube diameter is approximately 1:40. For most metal substrates, this provides a membrane which is thick enough to withstand 250 psi and 350° C. without tube collapse, but is not significantly thicker. The membrane thus maximizes permeation efficiency under a broad range of temperatures and pressures popularly utilized by those skilled in the art.

Generally, in a non-porous metallic membrane, the permeation barrier thickness will equal the wall thickness, and in a porous or porous supported membrane, the permeation barrier will be much smaller than the wall thickness.

With non-porous, metallic membranes, using smaller diameter tubes 14 for the hydrogen extraction module 5 of the present invention allows more surface area of membrane to be packed into a given module volume and allows the use of thinner wall tubes for both "pressure-outside" and "pressure-inside" designs. Further, thinner wall tubes involve less material cost than thick walled tubes and generally have higher flux as well.

The transport resistance in the tube wall generally increases in proportion to the wall thickness increases. Similarly, except for the design modifications specified in the present application, transport resistance in the stagnant gas layer next to the wall tends to increase in rough proportion to the tube diameter. This is particularly apparent in a pressure inside design such as that shown in FIG. 2A where the tubes are long and the gas flow is laminar. For such designs, the mass transport resistance is approximately that of a region of stagnant gas one-third as thick as the tube diameter. The amount of this resistance then decreases in direct proportion to the tube diameter.

The same advantages of small diameters also apply to pressure outside designs where the flow is turbulent and crosswise, or laminar flowing axially in the small space between the tubes. As set forth above, without the current invention, a turbulence inducing means, the stagnant gas layer thickness again decreases as the tube diameter decreases. Hence, the flux increases with decreasing tube diameters.

Turbulence producers, pellets, packing, bends, and catheters as shown in FIG. 1B can minimize the size of this stagnant layer. Use of baffles, protrusions, packing and the like with pressure-outside straight tube modules increase gas-phase phase mass transfer and improve separation efficiency. This is especially effective when the gas source contains a significant amount of non-permeable, such as carbon monoxide, methane, carbon dioxide, or water.

The only major disadvantage of the small diameter design is that axial pressure drops can become unacceptably high for any reasonable length of tube. This is the reason for specifying a minimum tube diameter for the tubes 14 of the present invention, and for distributing the axial flow among a plurality of tubes 14 or channels thereby allowing shorter tubes and thereby limiting the amount of fluid flow per tube or channel.

Figure 2B:
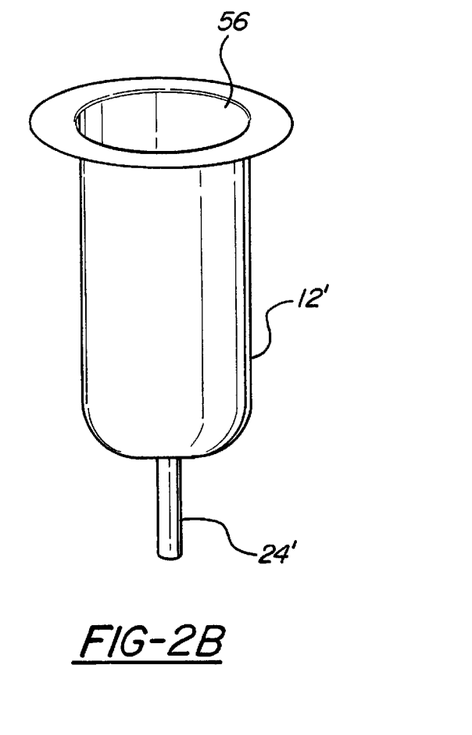
Figure 2C:
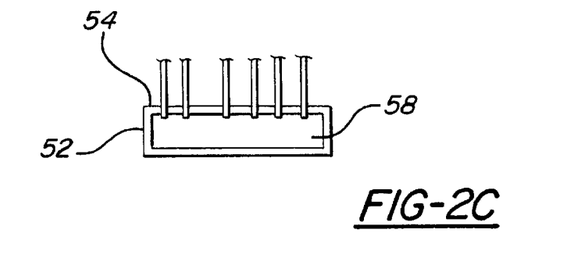

For ceramic-based tubes the optional diameters can be as large as 3 inches or even larger if packing or catheters, such as shown in FIG. 2B, or a well-chosen flow channel is used. A particularly useful flow channel in this regard is a small annulus, approximately 0.12 to 0.10 inches thick or an annulus containing bumps, protrusions, catalysts beads, baffles, or other turbulence generating means. This annulus allows the large membrane to have the same good transport characteristics as described above. Large diameter membranes are feasible with ceramic-based membranes because the substrate costs are low while the permeance tends to be high. The key feature of such a module is that there should be packing or the distance between the membrane and the catheter, or module housing (FIG. 1) should be 0.010 inches to 0.120 inches.

The tubes 14 are arranged axially and are closely spaced within the pressure vessel 12. The small diameter of the tubes 14 coupled with the permeation barrier or wall thickness set forth above provide a tube 14 which is capable of withstanding internal and/or external pressure without collapsing or crushing under the force of the pressure.

The use of large diameter to wall ratio tubes in pressure-outside designs, e.g. FIG. 1, requires one to support the tubes from collapse. This has been done previously with springs, but these springs are typically of only marginal benefit since the springs themselves bunch up when the tubes are put under pressure. One aspect of the present invention is to support those tubes with springs whose pitch angle is 30° or less such that the spring pitch spacing is less than half the inside diameter of the tubes. By specifying the spring pitch this way, one insures that friction between the spring and the interior of the tube prevents the spring from bunching regardless how high the external pressure.

A particular advantage of the present design is that it facilitates the function of a large bundle that is found to have a flaw or hole. As modules are constructed with greater volumetric output, additional membrane is required. This increased use of membrane enhances the probability of a leak being found somewhere in a membrane and the economic loss associated with such a leak. Typically, even one small leaking tube renders a module unable to attain desired purification levels. For this reason existing membranes use thick walled tubes to assure flaw free modules of fairly large size at the expense of additional membrane material. The present invention, with its relatively short tubes, makes it possible to seal off a leaking membrane after the module has been assembled. Thus, for example, the present invention is adapted to allow the removal of the header 46 and perform a high pressure bubble test on the complete module. Thereafter the ends of any tubes that are found to bubble or leak are sealed off. Sealing is illustratively accomplished by welding or by placing a drop of braze over the end of the leaking tubes. The specific sealing method being dictated by the nature of the tubular membrane. Alternatively, a flawed tube is cut from the base and a drop of braze sealed therein. Typically only one or two extra tubes must be added to a large bundle, thereby allowing one to utilize bundles that are found to contain one or two leaking tubes and obtain desired purification volumes. The ability to seal leaking tubes promotes practical construction of large bundles of thin-walled tubes.

The membrane 14 is capable of extracting hydrogen from a fluid stream containing hydrogen. The membrane 14 utilized in the apparatus 5 of the present invention can include any suitable hydrogen extraction membranes known to those skilled in the art. For example, the composite metal membrane disclosed in U.S. Pat. No. 5,215,729, issued Jun. 1, 1993 to the inventor of the present invention and incorporated herein by reference, can be utilized as a membrane in the present invention. However, as stated above, the composite metal membrane disclosed in the '729 patent is provided merely as an example and is in no way intended to be limiting to the types of membranes which can be utilized in accordance with the assembly 5 of the present invention.

For example, the axially disposed tubes 14 can be made of palladium alloys having the composition between Pd-20% Ag and Pd-50% Ag, Pd 40% Cu, Pd-10% Pt or other similar classes of Pd based alloys well known to those skilled in the art. The tubes 14 can also be constructed of a porous metal or ceramic or polymeric material with either a very small pore separation barrier or coated with palladium or silica to increase selectivity. The membranes can also include palladium coated polymeric membranes.

As stated above in the '729 patent, the tubes can also be Pd-coated refractory metal tubes. Additionally, the membrane 14 can include a platinum on palladium black coating to improve both flux and catalytic ability of the membrane 14 by increasing the surface area of the membrane 14. The membrane 14 can further include platinum alloy coatings.

Figure 4:
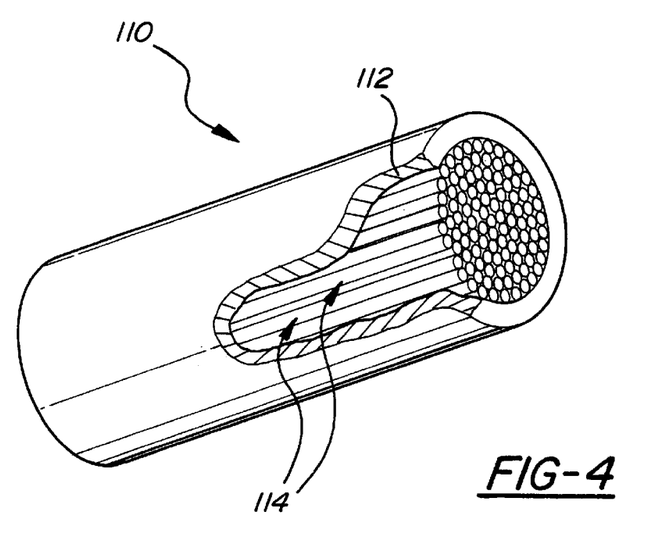
FIG. 4 is a fragmentary cross-sectional view of a tabular membrane bundle constructed in accordance with the present invention.

A module containing an alternative membrane is shown generally at 110 in FIG. 4. The Figure schematically shows an outer shell 112 containing a plurality of membranes generally indicated at 114. The membranes 114 are in the form of tubes. A portion of a tube is shown in cross-section in FIG. 5. The tubes are held within the shell attachment to a header sheet. The means of attachment of tubes to header sheet and of header sheet to shell is well known by those versed in the art of palladium-based hydrogen purifiers or of heat exchanger construction (see e.g. U.S. Pat. No. 4,313, 013 to Harris).

Figure 5:
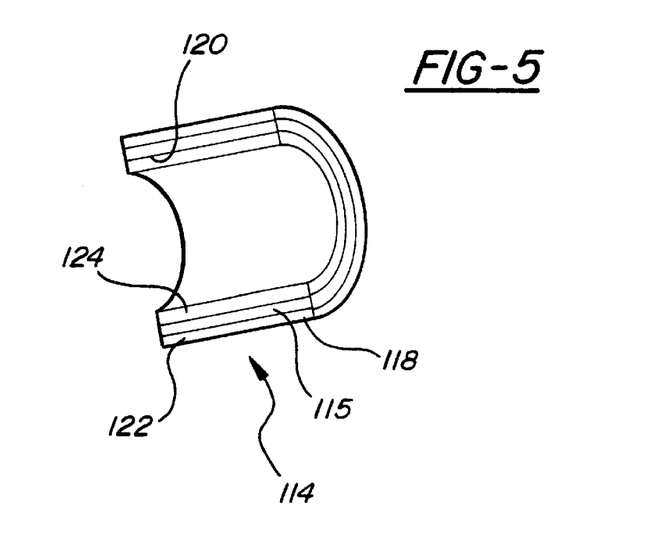
FIG. 5 is a membrane of the present invention.

The membrane 114 is capable of extracting hydrogen from a fluid stream containing hydrogen. The membrane 114 generally includes a first layer 115 of Pd—Ag or Pd—Cu alloy or combination thereof, such as Pd—Cu—Ag, which is permeable to hydrogen, the first layer 115 having a first outer surface 118 and an inner surface 120. The alloys can broadly range from 30 wt. % to 95 wt. % Pd. Typically, the Pd content ranges from 60 wt. % to 77 wt. %.

The Pd alloys of the first layer 115 are chosen for high hydrogen permeability in combination with good strength, low cost, ease of fabrication, low embrittlement, good swelling, and good durability characteristics in the presence of hydrogen and its admixtures. Pd—Ag alloys are desirable because they are relatively available, and are easier to fabricate than refractory metal substrates. They are also resistant to oxidation carbiding, and nitride formation, are fairly resistant to embrittlement and cracking, and are well accepted for use in the electronic gas industry.

A second layer 122 is coated preferably by a wet chemical method (electrolytic or electroless plating) over the first surface 118 and attached to the first layer 115, the second layer consisting essentially of palladium, palladium alloys, or platinum. For example, via a suitable method disclosed in Hsu and Buxbaum (1985), examples of palladium alloys are palladium-silver and palladium-gold. Other examples of metals for alloying with palladium for coating the substrate of the present invention can include ruthenium, indium, platinum, copper and rhodium. These alloys are more capable of dissociating hydrogen gas into molecular hydrogen, protecting the substrate from fouling, and operating in membrane-reactor environments. The molecular hydrogen which forms on this surface then permeates through the first layer 115.

An inner third layer 124 consisting essentially of palladium, palladium alloys, or platinum is coated over the inner surface 120 of the membrane. The palladium and platinum can be either smooth Pd or Pt or can be rough Pd or Pt black. Pd or Pt black are advantageous because they provide more catalytic surface area for a given length and diameter of membrane. This inner layer reassociates the hydrogen or alternatively catalyzes a hydrogen oxidation reaction, e.g. reacting the hydrogen with oxygen gas to form water. In either case this coating thereby promotes permeation through the membrane. That is, the second layer 122 dissociates hydrogen molecules in a fluid mixture into dissociated hydrogen molecules or H-atoms.

The hydrogen easily permeates the thin layer 122 or is drawn to cracks within the layer 122 via surface diffusion. The hydrogen is drawn through the membrane 115 following the path of lower free energy. The permeating hydrogen is associated into $H_2$ molecules or is oxidized (e.g. to water) on the surface of layer 124. The associated molecules then enter the tube and are carried off.

Alternatively, the direction of hydrogen permeation can be run from inside-out, as opposed to outside-in. That is to say, for example, that hydrogen molecules can diffuse through a membrane tube entering at the inside surface and can be removed at the outside surface.

Unlike prior art, noble metal hydrogen permeating membranes, the surfaces of this embodiment of the present invention have not been oxidized or reduced, quenched, or otherwise "treated." Instead there is a new layer of catalytic material deposited directly over the substrate. Another difference is that the substrate is no longer chosen for its hydrogen dissociation/recombination properties and, therefore, can be made from lower cost alloys than those currently employed.

The membrane thickness is chosen based on the expected pressure and temperature of operation and, for tubular membranes, on the diameter of the tube.

Typically, the thickness of the second and third layers 122, 124 are 0.01 to 20 microns, for design of membranes based on most of the alloys above.

The layers 122, 124 perform two functions. First, as stated above, the palladium, or less likely the platinum, are good dissociation catalysts of hydrogen gas or hydrogen rich molecules to atomic hydrogen. The atomic hydrogen then diffuses through the layers 115, 122 and 124. The layers 122, 124 further protect the base metal from poisons such as carbon, oxygen, nitrogen, and sulfur. Thusly, the layers 122, 124 can be said to react with the first layer 115 to make the surface thereof more permeable. Thusly, the present invention provides membranes having a first layer 115 with sufficient strength for the membranes to be made at a desired thinness but further having sufficient hydrogen permeability such that the membranes can be made at a thickness capable of withstanding commercially applied pressures.

The tubes 14 of the present invention can further include periodic crookedness, protrusions 18 or can be interspersed with a packing or mesh 19, or other types of features which can be disposed on either the internal and/or external surfaces of the tube 14 or 14' as shown in FIGS. 1B and 2A, respectively. These features intended to cause turbulence or break up the flow of fluid over the membrane tubes 14 to cause greater contact of the source fluid with the extraction membrane 14.

The optional internal passageway 13 allows for preheating the fluid stream and as a means to improve temperature uniformity in the fluid. A thermocouple (not shown) can be disposed in a thermocouple well 36 and used in combination with a heater (not shown) to heat the fluid stream. The hollow space, 46 can contain an additional sorber material 28 to increase the purity of the already purified gas by extracting remaining impurities before the gas exits at 24. This packing also provides some protection from membrane fouling during system upsets. Membrane poisons can be carried into the module by gases that back flow through the membrane. A classic case of this is arsine poisoning of palladium silver membranes during back flow incidents during the manufacture of semiconductors. Typical sorbent materials for ultra purification of hydrogen can include niobium, vanadium, zirconium, or titanium in the form of wire, pellets or rough-mesh granules.

Referring to FIGS. 2A and 2B, two "pressure-inside" embodiments of the present invention are shown. In these embodiments, the features that are the same as in the first embodiment are identified with the same numerals having a prime, and the features which are new are identified as such.

As briefly stated above and referring to FIG. 2A, one end of the tubes 14' can be mounted in a floating bead 52 to allow for expansion/contraction of the tubes 14' under the influences of heat, pressure, and hydrogen absorption in a "pressure-inside" embodiment. The ends of the tube 14' are shown attached to a fixed member 54 of the floating head assembly 52 by methods known to those skilled in the art. The floating head 52 moves within a cavity 56 defined by the vessel 12'. In this relationship, as the tubes 14' expand or contract, the floating member 52 moves within the vessel 12' thereby allowing for expansion and/or contraction of the tubes 14'.

The tubes 14' penetrate a top sheet 54 of the floating head 52 and are fixed to the floating head 52 where otherwise the floating head 52 is sealed. Thus, when the impure gas flow reaches ends of the tubes 14', the gas remains pressurized within the empty space, 58, and is returned up other tubes 14' attached to the floating head assembly 52. Thus the gas is not allowed to escape to the exterior, except for that hydrogen which diffuses through the tube walls.

At the end of the tubes 14' opposite the end attached to the floating head 52, the tubes 14' are attached to a divided fixed head 42. This fixed head 42 allows the fluid mixture to enter via the inlet 22' and to be distributed to the tubes 14' via a distribution section 44 (shown here as the center of the fixed head 42). The fixed head 42 also collects the raffinate in a section 46' so that it exits through outlet 26'.

The fixed head assembly 42 can include a cartridge heater 48 used to control the temperature of the assembly 40. The fixed head assembly 42 can further include a thermocouple disposed in a well 50. The use of the floating-head assembly 52 allows for pressure to be maintained on the inside of the tubes 14' rather than on the outside of the tubes as is the case in the embodiment utilizing only capped ends on the tubes 14 as shown in FIG. 1. As with the first embodiment of the apparatus 5, the tubes 14' can be sealed to the top sheet 54 e.g. by braze, glue, solder, or high temperature cement or adhesive.

Figure 3A:
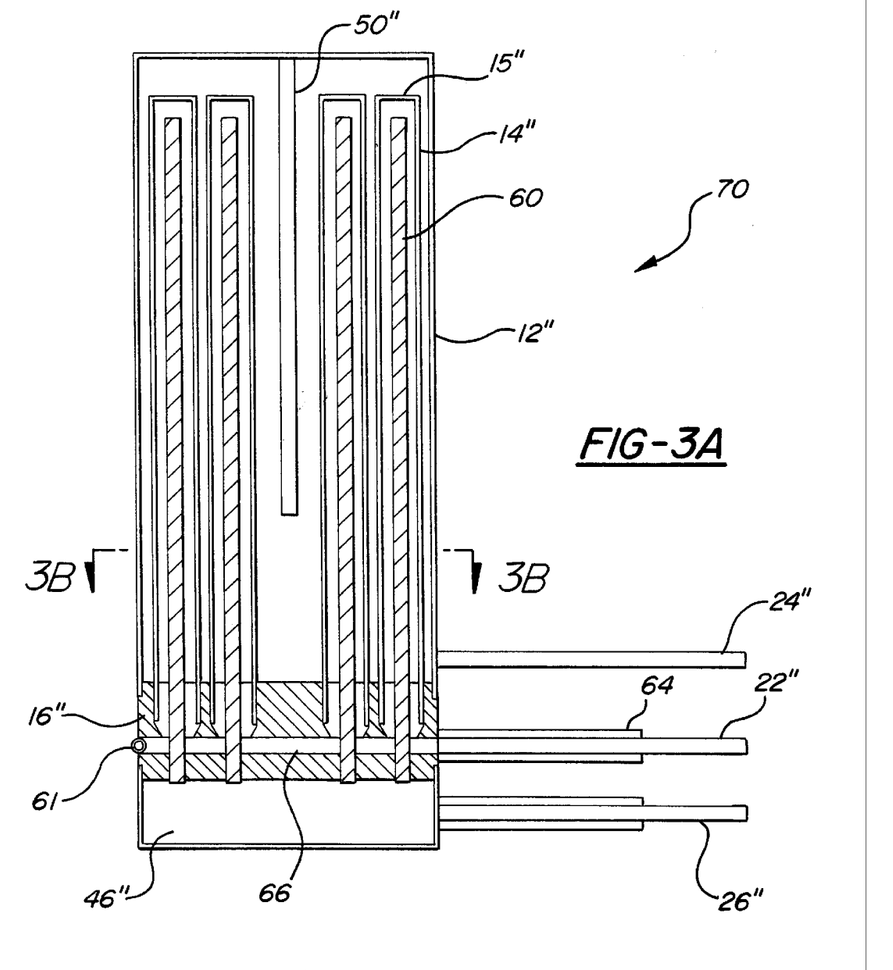
FIG. 3A is a schematic cross-sectional view of an apparatus including a plurality of membranes constructed in accordance with the present invention
Figure 3B:
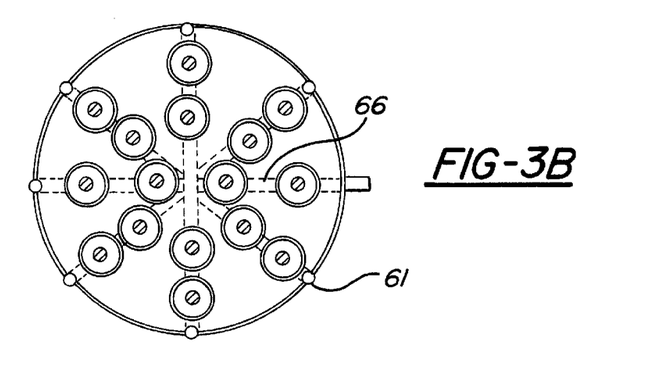
FIG. 3B is an orthogonal view of the apparatus depicted in FIG. 3A facing downward from plane 3B—3B.

In an alternative embodiment of the apparatus, shown in FIGS. 3A and 3B, the tubes 14" are independently capped as in FIGS. 1A and 1B. The cap is indicated as 15" but the flow is maintained on the inside of the thimbles by means of interior catheters 60. There is a fixed head 16" but the flow within it is complex as described below. Gas enters from the inlet 22" and flows through an optional heating section 64. The flow is distributed through a series of distribution channels 66 within the fixed head 16". These channels distribute the gas to the inside of the tubes 14". Hydrogen permeates through the tube walls and is collected within the region surrounded by the shell 12". The pure hydrogen exits at outlet 24". The impure gas cannot exit the tubes at the tube tops because of the caps 15". The impure gas returns down the catheter tubes 60 and is collected in a region below the fixed head 46".

The gas collected at 46" contains concentrated impurities as well as some hydrogen and exits at outlet 26". Seals 61 are disposed about the distribution channels 66 to allow easy manufacture, and a thermocouple wall, 50", is shown for temperature regulation. Temperature measured by the thermocouple placed at 50" is used to control the heater 64. There can also be an additional support frame (not shown) within the shell 12" to aid manufacture and keep the tubes from rattling. As with the pressure outside design in FIG. 1A, there can be an additional sorber material (not shown) in the empty space of 46" to sorb out any remaining impurities before the gas exits.

For tubes constructed of materials where expansion and contraction are not serious concerns, the "pressure-inside" design can be fabricated with two fixed heads disposed at opposite ends of the axial tubes. This design is not shown but will be readily comprehended when read in light of the present invention.

Figure 8:
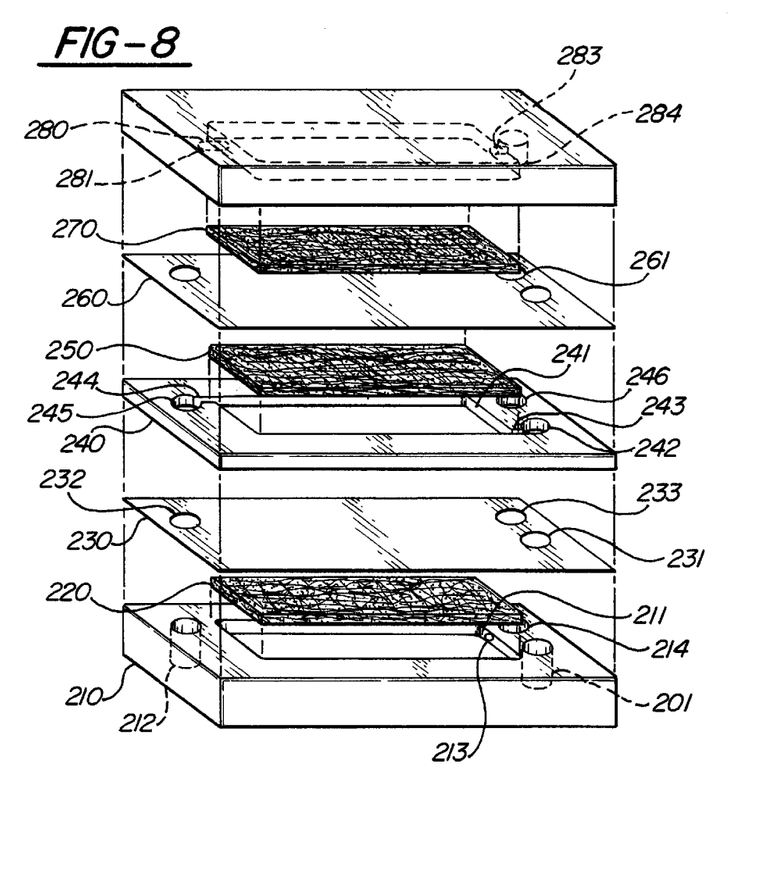
FIG. 8 is a schematic exploded view of a flat-plate embodiment according to the present invention; and, FIG. 9 is a perspective cutaway view of a cartridge apparatus according to the present invention incorporating a flat plate membrane.

FIG. 8 shows a plate separator which is vacuum contact brazed from constituent parts. A first wave spring or ceramic mat 220 is inserted into a slot 211 in a base 210. Preferably the base 210 is constructed of an oxidation resistant fusable high temperature metal alloy illustratively including Monel. A first thin membrane of palladium-copper 230 overlies the wave spring or mat 220. A layer of a Monel type material 240 having a cut out 241 overlies the membrane 230. A ceramic mat 250 which is optionally catalytic towards gaseous reactant species is adapted to fit within the cut out 241. A second palladium-copper membrane 260 and a Monel type material top 280 overlie the mat 250. A second wave spring or mat 270 inserts into a slot 281 in the top 280 and resides between the membrane 260 and the top 280. It is appreciated that neither slot 211 or slot 281 is a through passage.

A mixed gas enters a portal 201 and passes through hole 231, and into hole 242. From there, the gas passes through a channel 243 into cut out portion 241. Gas flowing across the cut out 241 passing over the ceramic mat 250 provides turbulent mixing of the gas and optionally catalytic activation. The hydrogen component of the mixed gas passes through the membranes 230 and 260 and ends up in the two slots 211 and 281. The wave springs of ceramic mats 220 and 270 prevent the membranes 230 and 260 from tearing from the pressure differential that exists across the cut out area 241 and the slots 211 and 281. The gas mixture raffinate exits via channel 244 into hole 245. From there, raffinate passes to hole 232 and 212 and exits the apparatus. The purified gas component flows past the wave springs 220 and 270 into side holes 213 and 283 respectively. Thereafter, purified gas component enters holes 214 or 284. The pure gas flows from 284 through holes 261, 246 and 233, combining with the other stream of pure gas exiting at hole 214. It is appreciated that the two plate gas extraction membrane disclosed herein is amenable to the addition of further membrane layers with the accompanying modifications in gas flow management elements.

The space between the flat plate membrane where the mixed gases flow is defined by the cut out area 241. The length of that cut out must be at least twice as great as the width unless there is a turbulence-generating means within the cut out, such as the spring or mat 250. This ratio reduces the gas-phase mass transport resistance which otherwise decreases mixed gas flux. It also provides advantages in increasing membrane strength. Further, unless there is a support means, such as the spring or mat 220, the ratio between the width of the gap and the thickness is between 10 and 200. Preferably, the gap thickness of at least 0.005" is present to prevent excessive pressure drop, particularly in the channel 243. Because gas-phase mass transfer resistance increases with width and gap thickness, it is preferred to add a turbulence generating means, such as the porous ceramic mat 250 within the cut out 241. In order to increase the overall purification effectiveness, cut out areas optionally are combined either serially or in parallel. When the cut outs are in parallel, it is preferred to add flow-reducing flits therebetween or similar means to insure a balance of flow through the parallel cut outs.

Figure 9:
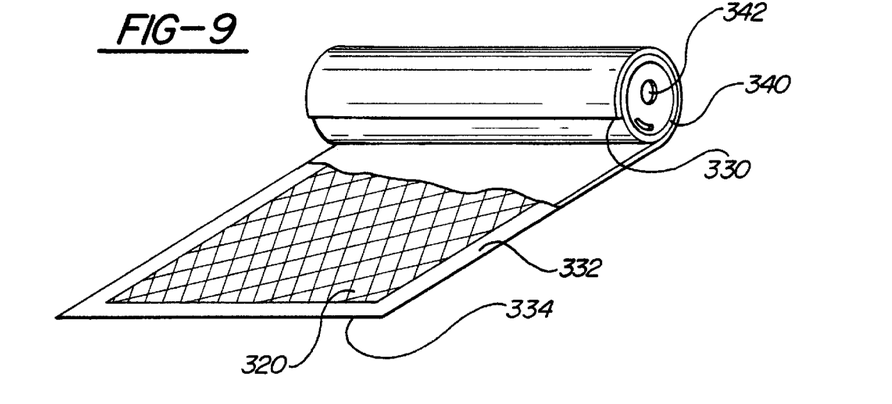

FIG. 9 is a schematic view of a cartridge type apparatus according to the present invention incorporating a flat plate membrane. The design of this apparatus follows that of reverse osmosis membranes, for example U.S. Pat. No. 5,681,467. A thin, bendable sheet membrane 330 is creased to form a fold and a spring or ceramic mat spacer 320 is inserted into the interior fold. The interior 332 of the membrane 330 being active towards gas separation. The membrane 330 is then wrapped against a central conduit 340 having a bore 342 in fluid communication with the outside 334 of the folded membrane. Preferably a plurality of folded membranes having spacers within are wrapped against the central conduit. A header (not shown) is connected to the wrapped membranes so as to only be in fluid communication with the interior fold 332 of the membrane 330 and the spacer 320. Thus, a mixed gas flow entering a header (not shown) is depleted on a pure gas component through membrane contact. The pure gas diffusing through the membrane 330 into the conduit 340 leaves a raffinate which is removed by way of an outlet (not shown) which is only in fluid communication with the interior fold 332 of the membrane 330 and the spacer 320. The pure gas within the conduit 340 is removed by way of suitable tubing in fluid communication therewith.

It is appreciated that a cartridge type apparatus of the present invention is optionally operated in reverse with an inlet header conveying mixed gas flow into the conduit 340 and a raffinate outlet. Pure gas being collected from within the fold interior after passing through an inverted membrane having an activated exterior surface for gas separation.

Turbulence generating means operative in the present invention include corrugations, ridges, protrusions, wires, adherent particulate and baffles. Such turbulence generating means disrupt laminar flow of a mixed gas flow over the outer membrane surface so as to promote contact between the mixed gas flow and the purification membrane. Turbulence generating means are mechanically stamped into a plate membrane or alternatively formed by methods as disclosed in U.S. Pat. No. 5,498,278.

Novel membrane alloys that are particularly well suited for hydrogen purifiers differ from the two and three layer membrane disclosed in U.S. Pat. No. 5,215,729 to the present inventor, by specifically contacting a second layer to the first layer of the membrane to reduce the tendency for hydrogen embrittlement and/or for palladium-metal inter-diffusion. Useful alloys of the present invention in this regard are: Ta—W (W=2.5 to 25%), V—Co (Co=1 to 8%), V—Pd (Pd=1 to 10%), V—Au (Au=1 to 10%), V—Cu (Cu=1 to 10%), V—Al (Al=5 to 20%), Nb—Ag (Ag=1 to 10%), Nb—Au (Au=1 to 10%), Nb—Pt (Pt=1 to 10%), Nb—Pd (Pd=1 to 10%) and their combinations, either with each other or with nickel, including V—Ni—Co (Ni=0 to 15%, Co=1 to 8%), V—Ni—Pd (Ni=0 to 15%, Pd=1 to 8%), V—Nb—Pt (Nb=0 to 15%, Pt=1 to 10%) or V—Pd—Au (combination Pd, Au concentration=1 to 20%) wherein the percentages of lesser constituents are weight percent of total weight. Preferably, the less weight percent component is present from 2 to 10%. More preferably, the alloy is one of the following: V-10% Pd, V-5% Ni-5% Co, and V-10% Ni-2% Co.

There are various uses for the hydrogen extraction modules 40 and 70 constructed in accordance with the present invention. For example, the apparatus can be used as a hydrogen extractor for removing hydrogen from refinery gas streams such as cat-cracker off gas, hydrodesulfurization gas or process gas mixes of carbon monoxide, hydrogen, water and carbon dioxide. Alternately it can be used to provide ultrapure hydrogen for analytic (e.g. gas chromatographic) use or electronic manufacture. Alternately this invention can be used to adjust the ratio of hydrogen and carbon monoxide from synthesis gas in methanol or related chemical synthesis.

The packing described previously can be catalytic (e.g. catalyst pellets or Pt mesh). This embodiment of the present invention can be used when removing hydrogen from mixtures of alkanes and alkenes, or for the reforming of methanol water mixtures. Adding a catalytic packing makes these modules into membrane reactors and so favors alkene and hydrogen production. For example, this process can be used in the production of butene from butane; an initial butene-forming reactor could be followed by a membrane reactor made according to the present design. Butene production would be enhanced, and the hydrogen gas would be extracted through the membranes for use elsewhere.

These modules can also be used as a hydrogen extractor for the removal of radioactive hydrogen isotopes from nuclear reactor streams. For this use, it may be advisable to employ a membrane that is coated with palladium on only a single side. This is because many important nuclear reactor streams (e.g., liquid metals) are reactive to palladium.

The module designs listed above could also be beneficial for purification of other gases (e.g. helium or arsine) if the appropriate membrane is used. Thus, for example, an array of small-diameter silica membranes could be packaged in a catheter-inside module as shown in FIG. 2B for use in helium purification.

As a hydrogen extractor, the present invention can be used for ultra-purifying cylinder or electrolysis derived hydrogen for use, for example, in electronics manufacture or gas chromatography. Also as a hydrogen extractor it can be used for removing hydrogen from mixtures of alkanes and alkenes, so as to favor alkene production. For example, this process can be used in the production of butene from butane; hydrogen gas would be extracted at intermediate stages in a furnace-reactor-furnace-reactor etc. train, the hydrogen being available for use elsewhere.

In a similar respect, the membrane can take advantage of the differences in diffusivities and permeabilities of the various hydrogen isotopes, especially at low temperature. Thus, as a hydrogen extractor, the membranes of the present invention can be used to separate different hydrogen isotopes from others as well as from non-hydrogen components.

As a membrane reactor, the present invention can be used for removing hydrogen during the production of alkenes from alkanes. For example, the present invention can be used for making butene from butane by shifting the equilibrium within the reaction chamber. This case would be like the reactor furnace extractor train mentioned previously, but condensed into a single process membrane reactor. The endothermisity of the reaction can be aided by adding a diluent, e.g. steam, to the hydrogen extractrate side of the membrane or by the addition of oxygen on the side. The hydrogen that is burned in this way is lost for other uses thereby, but the alkene formation reaction (generally an endothermic reaction) would be heated in situ by the hydrogen oxidation and accordingly, hydrogen pumping, membrane reactor, and furnace costs would be minimized.

Also as a membrane reactor, the present invention can be used for low temperature hydrogen generation from partial combinations of gasoline or from alcohol reforming reactions. It can also be used to enhance the specificity of hydrogenation reaction where hydrogen is extracted from a fluid stream and used to hydrogenate a product. Hydrogenation of a stream containing butadiene and butyne has some commercial potential. The butyne would be preferentially hydrogenated allowing it to be economically extracted as butene and recycled. There are also applications in vitamin and perfume manufacture.

The following examples illustrate the utility of the present invention for removing hydrogen from a fluid mixture containing hydrogen whereas coated membranes as shown in FIGS. 3 and 4 are used.

Materials and Methods for Experiment

Sections of Pd-25% Ag tube (3/32"× of 0.0015" wall) were cut. The tubes were coated with palladium grey as per standard electroless procedure.

The sections were assembled in apparatus with a Swagelok cap (available from Cajon Co., Macedonia, Ohio) on one end providing a seal. A Swagelok reducing union with a graphite ferule was applied on the other end. In later experiments, the Swagelok cap was replaced by a brazed metal cap.

Several volumes of nitrogen were applied at room temperature until most of the air was flushed out. The assembly was then heated to desired temperature approximately 400° C. and $H_2$ was applied to the apparatus. The pressure upstream and downstream of the membrane was measured. The flow of $H_2$ gas through the membrane and the outflow of the purge stream were also measured. The various parameters were calculated.

The membrane was composed of Pd-25% Ag coated with palladium. The surface had a composition of:

|  |  | After Run | Before Run |
|---|---|---|---|
| Inside surface | Pd: | 97.83 | 99.08 |
|  | Ag: | 2.17 | 0.92 |
| Outside | Pd: | 97.73 | 93.83 |
|  | Ag: | 2.27 | 6.17 |

From the above it appears that in operation palladium is transferred from the inner to the outer surface of a palladium-silver membrane. Thus, one advantage of palladium coating a palladium-silver membrane is that it forestalls palladium depletion on the inner (low hydrogen pressure) side of the membrane. This extends the useful membrane life.

Figure 6:
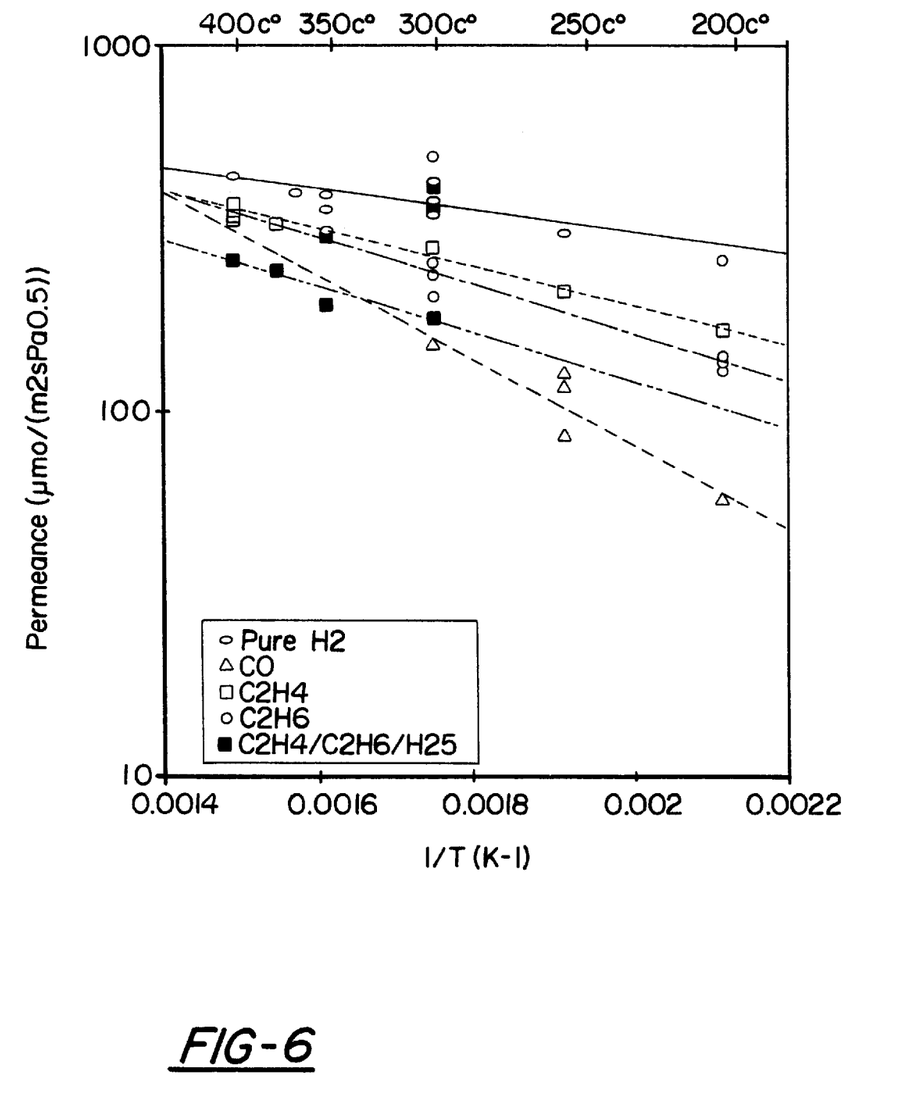
FIG. 6 is a graph comparing the permeation of hydrogen to that of mixed gases using membranes of the present invention.
Figure 7:
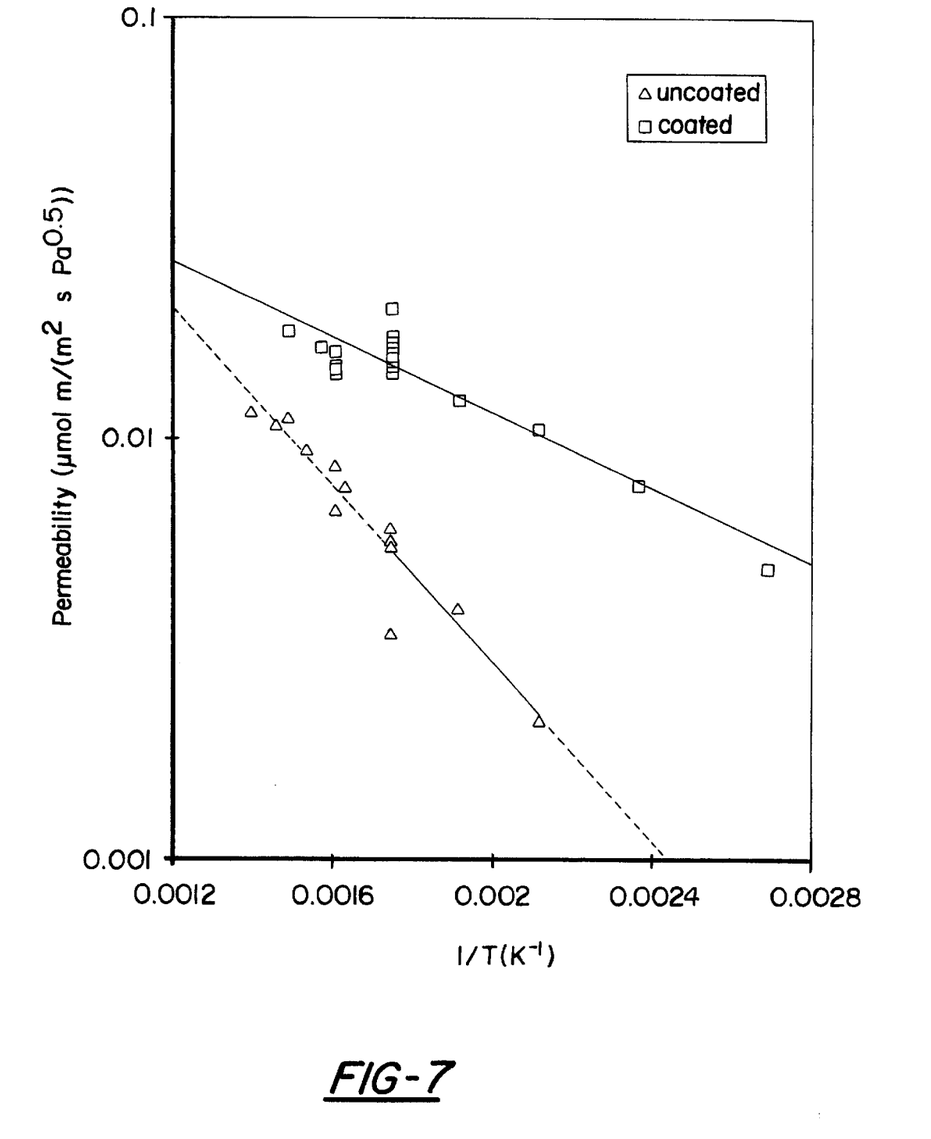
FIG. 7 is a graph showing the permeability of hydrogen through a membrane of the present invention as compared to an uncoated membrane.

As a control, an uncoated Pd-25% Ag tube was run as per the same procedure and the results comparing the two membranes are shown in FIG. 6. Compared to the uncoated membrane, the coated membrane was far superior at low temperature operation where, apparently, the palladium catalyzes the $H_2$ association/dissociation far better than palladium-silver. Also, the coated membrane was better at resisting poisoning from hydrogen sulfide and ethylene.

The invention has been described in an illustrative manner, and it is to be understood the terminology used is intended to be in the nature of description rather than of limitation. Unless stated otherwise, compositional percentages are weight percent based on total weight.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

All patents and other publications cited are incorporated herein by reference.

What is claimed is:

1. A gas purification membrane consisting of:
   a substrate; and
   a planar layer having a first surface and an opposing second surface contacting the substrate wherein said layer and said substrate are permeable to a component gas of a contacting gas mixture and the first surface is textured to promote turbulent gas mixture flow thereover.

2. The gas purification membrane of claim 1 wherein the second surface is textured.

3. The gas purification membrane of claim 1 wherein the first surface is textured with bumps.

4. A gas purification apparatus comprising: a central conduit defined by a wall having fluid communication through the wall;
   a hydrogen extraction membrane creased to form a fold having an interior surface permeable to hydrogen within a mixed gas flow and an exterior surface, wherein the exterior surface is wrapped against said central conduit;
   a spacer inserted within the interior surface of the fold;
   a header to introduce the mixed gas flow into contact with the interior surface and preventing the mixed gas flow from contacting the exterior surface;
   a tube for removing hydrogen from said conduit, and
   an outlet for raffinate which is in contact with the interior surface of said fold.

5. A gas purification membrane comprising: a metallic substrate layer having an outer surface and an inner surface wherein said substrate is selected from the group consisting of: Ta—W (W=2.5 to 25%), V—Co (Co=1 to 8%), V—Au (Au=1 to 10%), V—Cu (Cu=1 to 10%) V—Al (Al=5 to 20%), Nb—Ag (Ag=1 to 10%), Nb—Au (Au=1 to 10%), Nb—Pt (Pt=1 to 10%), V—Ni—Co (Ni=0 to 15%, Co=1 to 8%), V—Ni—Pd (Ni=0 to 15%, Pd=1 to 8%), V—Nb—Pt (Nb=0 to 15%, Pt=1 to 10%) and V—Pd—Au (combination Pd, Au concentration=1 to 20%) and combinations thereof; and
   a first layer affixed to the outer surface of said substrate, said fist layer selected from the group consisting of: palladium, palladium alloys, platinum and platinum alloys.

6. The membrane of claim 5 wherein said metallic substrate layer is V—Ni—Co.

7. The membrane of claim 6 wherein said metallic substrate layer is V-5% Ni-5% Co.

8. The membrane of claim 6 wherein said metallic substrate layer is V-10 Ni-2% Co.

9. The membrane of claim 5 wherein said metallic substrate layer is planar.

10. The membrane of claim 5 wherein said first layer is a palladium-silver alloy.

11. The membrane of claim 5 wherein said first layer is a palladium-copper-silver alloy.

12. The membrane of claim 5 wherein said first layer is a palladium-copper alloy.

13. The membrane of claim 5 wherein said metallic substrate layer has a thickness ranging from 0.001 to 0.010 inches.

14. An improved method for manufacture of a hydrogen purification apparatus having at least two metallic membrane tubes, each of said at least two metallic tubes having an open end for communication with an inlet gas stream, wherein said at least two metallic tubes form around the open ends a gas tight seal to a head assembly, and wherein a region of one tube of the at least two tubes leaks an inlet gas steam therethrough without exacting hydrogen purification, wherein the improvement lies in: sealing the region of the one leaking metallic tube against entrance of the inlet gas stream at a position proximal to where the one leaking metallic tube attaches to the head assembly wherein sealing a hydrogen purification membrane tube is accomplished by welding, soldering or brazing.

15. The improved method of claim 14 wherein said at least two metallic membrane tubes comprise palladium.

16. The improved method of claim 14 wherein said at least two metallic tubes comprises at least ten tubes.

* * * * *